United States Patent [19]
Lin

[11] Patent Number: 5,956,181
[45] Date of Patent: Sep. 21, 1999

[54] TWO WAY MIRROR WITH DUAL FUNCTIONS OF REAR VIEW MIRROR AND VIDEO DISPLAYER

[76] Inventor: William Lin, 38891 Fremont Blvd., Apt#14, Fremont, Calif. 94536

[21] Appl. No.: 08/896,488

[22] Filed: Jul. 18, 1997

[51] Int. Cl.$^6$ .................................................. G02B 27/14
[52] U.S. Cl. ......................................................... 359/630
[58] Field of Search ................................. 359/630, 631, 359/632; 348/148, 151

[56] References Cited

U.S. PATENT DOCUMENTS 5,289,321  2/1994  Secor ...................................... 359/896
5,570,127  10/1996  Schmidt ................................. 348/148
5,775,762  7/1998  Vitito ...................................... 296/37.7

Primary Examiner—Georgia Epps
Assistant Examiner—Ricky Mack
Attorney, Agent, or Firm—Chi Ping Chang

[57] ABSTRACT

The present invention discloses a two way, rear view mirror suitable for providing alternatively or simultaneously both a conventional reflected image and a video image. A preferred two way mirror of the invention comprises a flat transparent plate coated with or glued with a reflective film mounted within a casing which provides supports for the mirror and a mounting space for at least one video display monitor with a built-in light source mounted in said casing and positioned directly behind said reflective film to receive and display image received from a variety of information sources.

10 Claims, 7 Drawing Sheets

TWO WAY MIRROR WITH DUAL FUNCTIONS OF REAR VIEW MIRROR AND VIDEO DISPLAYER

FIELD OF THE INVENTION

This invention relates generally to rear view mirrors for use in auto vehicles, and more specifically, to a rear view mirror which can functions either separately or simultaneously, as a mirror and a video display unit.

BACKGROUND OF THE INVENTION

Conventional rear view mirrors have a limited function of providing a driver of a motor vehicle with a reflected view of the area behind the driver both inside and outside the vehicle. In some instances, however, the conventional mirrors provide an incomplete or otherwise inadequate view of the area behind a vehicle. One example of this problem can be found in the case of large trucks, as illustrated by FIG. 1, in which the cargo area of the trucks A either partially or completely obstructs the view from the rear window of the vehicle such that the driver's view of the person B standing behind the vehicle is fully obstructed by cargo area A.

Another example of this problem is presented by the phenomenon known as the "blind spot" as illustrated by FIG. 2, in which conventional rear view mirrors provide a limited view of the area behind and to the side of vehicles such that the motor vehicle D is in the "blind spot" of the motor vehicle C because the driver of vehicle C cannot see vehicle D in his rear view mirror.

Although several patents have issued for rear view mirrors that are capable of operating as fully functioning mirrors while displaying alphanumeric information, see for example U.S. Pat. No. 4,630,904 issued to R. Pastore [rear view mirror displays digital clock or radar detector], no prior rear view mirrors have been able to provide both a conventional, reflected rear view and a live video display of the area outside the vehicle.

It is therefore an object of the present invention to provide a mirror that can provide both a conventional, reflected rear view and a video image of the area outside of the vehicle. The present invention will also enable the driver to view a variety of entertaining, and/or useful and/or safety related information without needing to remove his/her eyes from the rear view mirror or needlessly interrupting the forward looking gaze that is generally recognized as the safest manner to operate a motor vehicle.

SUMMARY OF THE INVENTION

This invention relates to a two way, rear view mirror that can provide both a conventional, reflected rear view and a video view of the area outside of the vehicle.

One aspect of the invention is to provide for a two way mirror that provides complete reflection when the video display is not being utilized. This two way mirror can be constructed of a tinted glass or a plastic or a clear glass or plastic that is made reflective by the addition of a thin, reflective film to the glass or plastic. In the preferred embodiment, this tinting or film is placed on a backside of the plastic or glass.

Another aspect of the invention involves the placement of one or more video display monitors with a built-in light source behind the two way mirror. Said video display monitors can be of a variety of sizes and placed in a variety of positions behind the mirror intended to receive information from a variety of output/input devices to display such information on the two-way mirror when the video display monitors are being utilized.

BRIEF DESCRIPTION OF THE DRAWINGS

The present invention will be described with greater specificity and clarity with reference to the following figures, in which.

DETAILED DESCRIPTION OF THE INVENTION

Figure 1:
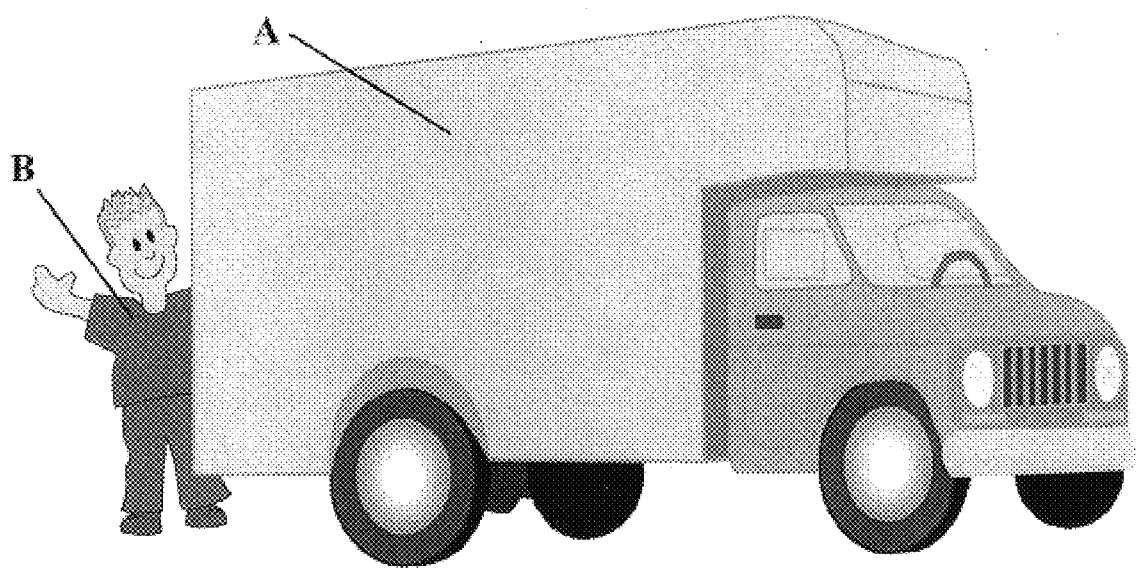
FIG. 1 is a side view of a large garbage truck, in which the cargo area A of said vehicle either partially or fully obstructs the driver's view of a person B from the rear view mirror.
Figure 2:
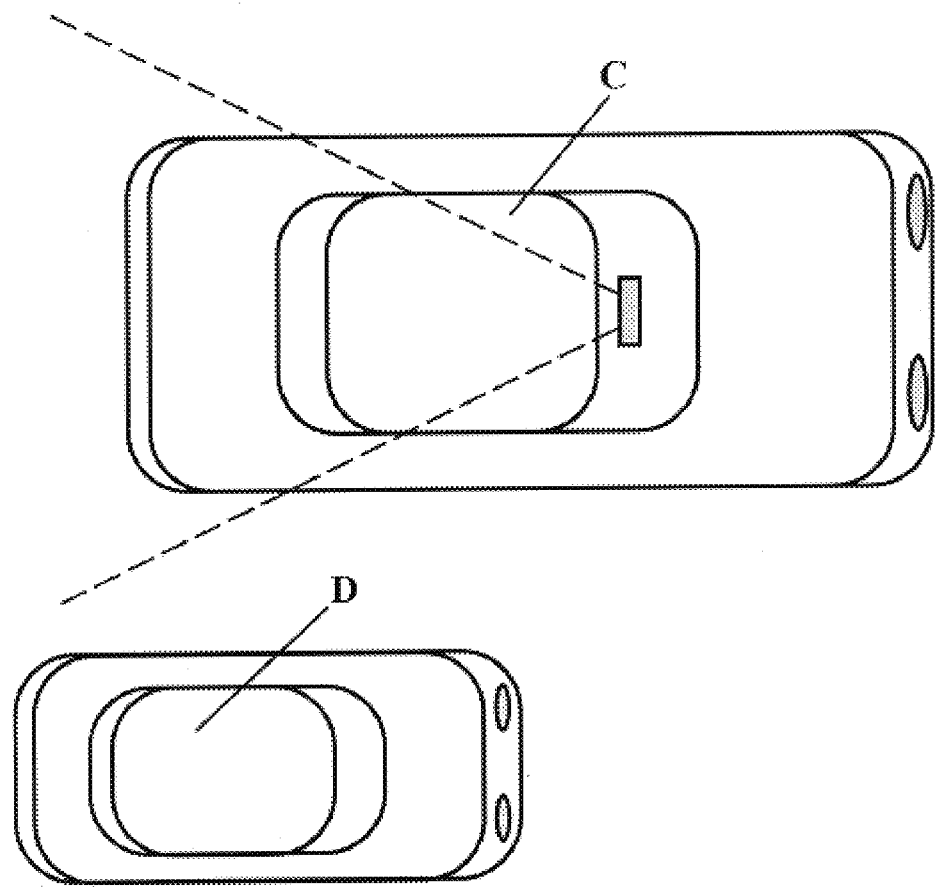
FIG. 2 is a top view of motor vehicle C and motor vehicle D, in which motor vehicle D is in the "blind spot" of motor vehicle C.
Figure 3:
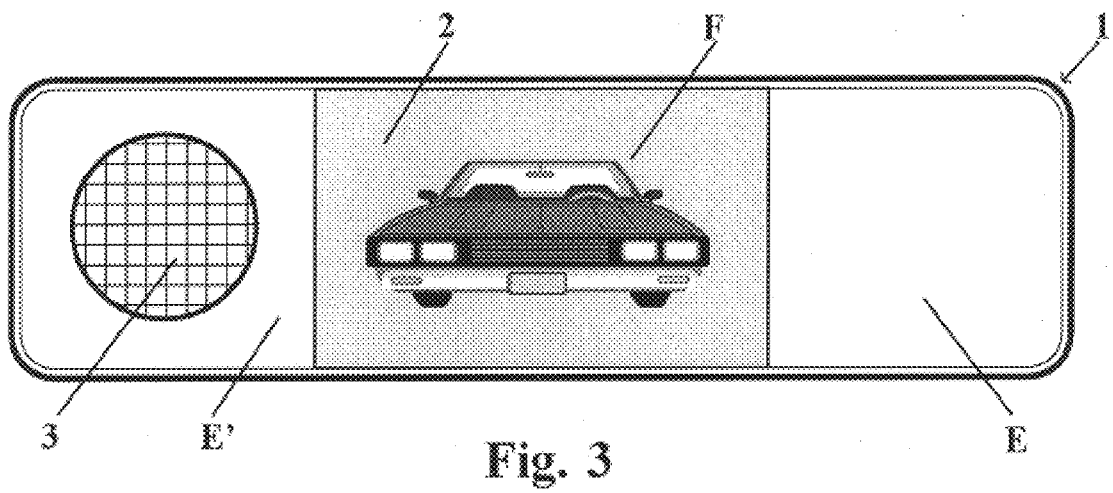
FIG. 3 is a front view of a two way mirror in accordance with the invention.

Referring to FIG. 3, there is shown a front view of a two way mirror 1 embodying the principles of this invention, with a video display monitor 2 being positioned in the center of the mirror 1 and being utilized by a driver of the motor vehicle. As seen in this diagram, the driver of the motor vehicle is able to see a conventional rear view in a left and right hand portions E' & E of the mirror 1 that do not directly abut the video display monitor 2. At the same time, the driver is able to see an image F being displayed on the video display monitor 2, thus providing the driver with access to the video display and simultaneously leaving the left and right hand portions E' and E of the mirror 1 for conventional reflection viewing. As an additional option, an audio device such as a speaker 3 can be placed within the left hand protion E' to provide a sound effect while the image F is being displayed. When the video display is not being utilized, the entire mirror is available for conventional reflection viewing.

Figure 4:
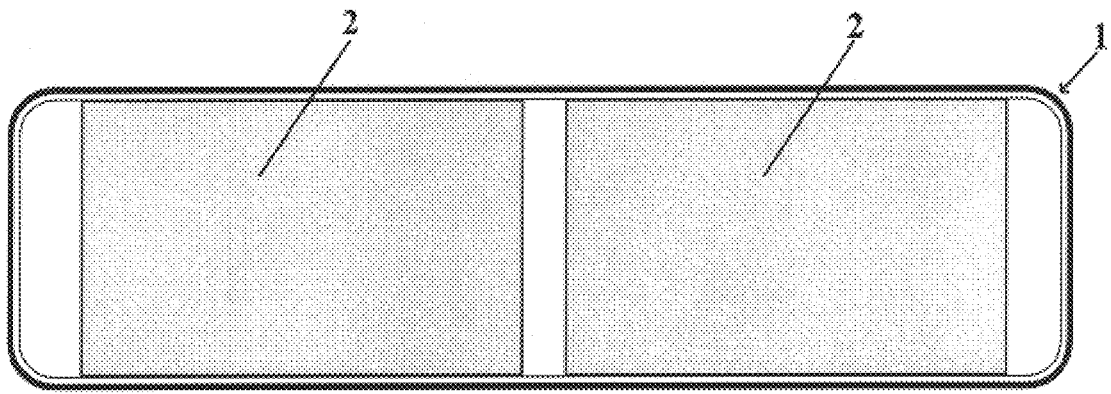
FIG. 4 is a front view of a two way mirror in accordance with the invention in which two separate video monitors have been placed within the mirror.

Referring to FIG. 4, there is shown a front view of the two way mirror 1 according to the invention in which two separate video display monitors 2 have been placed within the mirror. Under this arrangement, the driver has access to either the left video monitor, the right video monitor, or both video monitors while a portion of the mirror remains available for conventional reflection viewing. When the video displays are not being utilized, the entire mirror is available for conventional reflection viewing.

Figure 5:
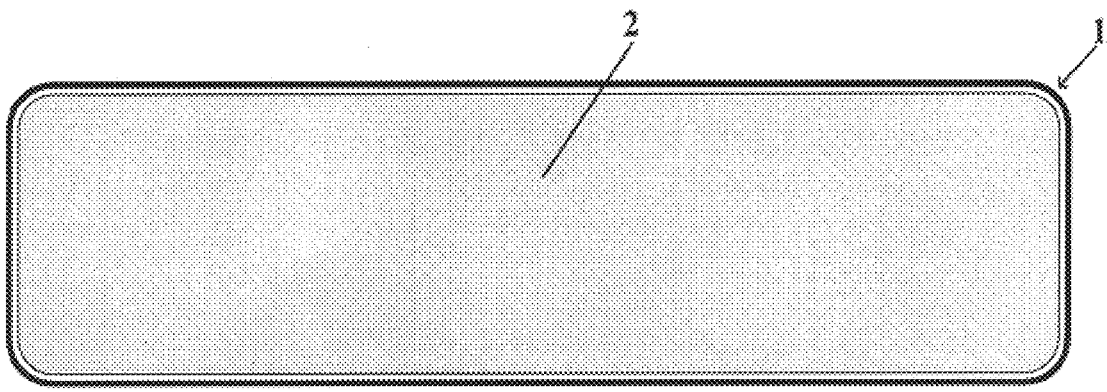
FIG. 5 is a front view of the two way mirror as shown in FIG. 3 except that one video monitor has been placed within the entire mirror structure.

Referring to FIG. 5, there is shown a front view of one more arrangement of the two way mirror 1 according to the invention in which one video display monitor 2 has been placed within the entire mirror structure. When the video display is not being used, the entire mirror is available for conventional reflection viewing.

Referring jointly to FIGS. 3, 4, and 5, it becomes apparent that depending on the needs and preferences of the driver, one or more video display monitors 2 can be positioned in a variety of locations within the mirror 1.

Figure 6:
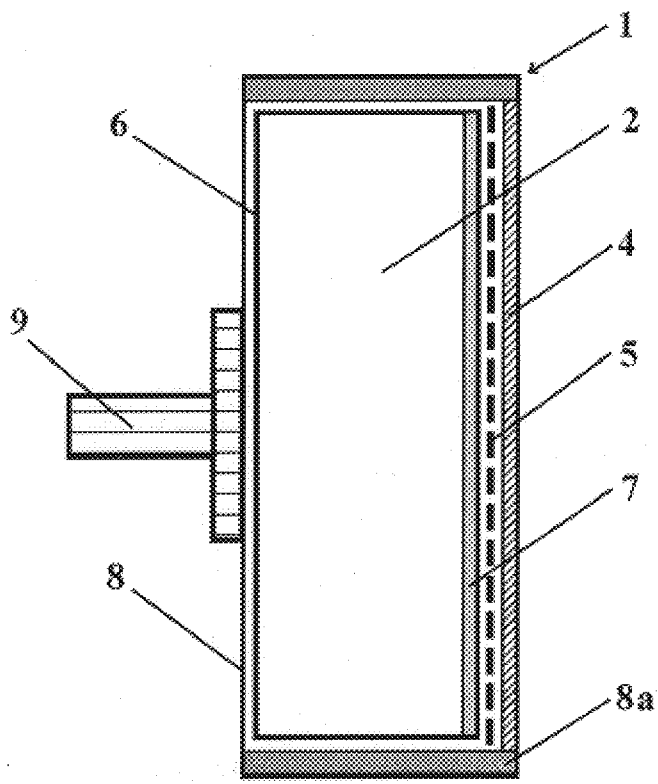
FIG. 6 is a side view of said mirror assembly.
Figure 7:
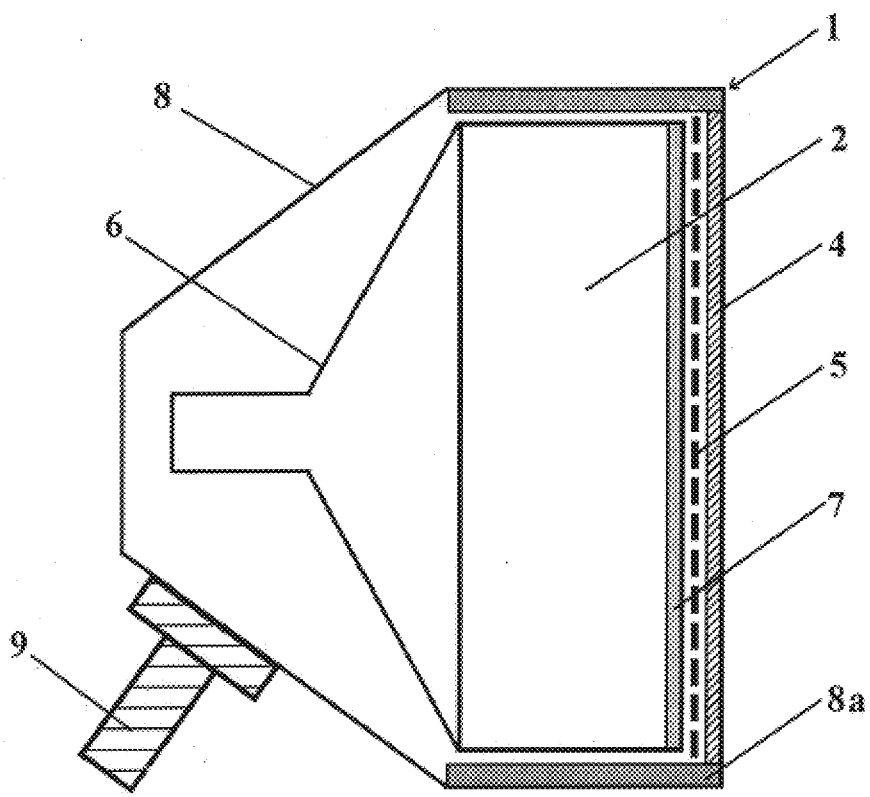
FIG. 7 is another side view of said mirror assembly in which the back of the video display monitor protrudes beyond the side casing of the mirror assembly.

Referring jointly to FIGS. 6 and 7, it is shown that the mirror 1 is constructed of a flat transparent plate 4, which may be either a glass plate or a plastic plate, on a back side of which is placed a translucent reflective film 5 made by either silver or alumimun. On the back side of the flat transparent plate 4 is mounted a casing 8 made of solid plastic or metal materials, in conjunction with a metal clip 8a, to hold the mirror 1 along the circumference of the mirror 1 which may be mounted to a surface by a support column 9.

The casing 8 is mounted to the mirror 1 in such a way that a space is provided to accommodate the video display monitor 2 which is mounted in and enclosed entirely inside the casing 8 and placed directly behind the reflective film 5, in a variety of positions as illustrated by FIGS. 3, 4, and 5 above. The video display monitor 2 has a video display screen 7 at its front side for image display and a back side 6 from where a lead wire (not shown) leaves the rear of video display monitor 2 through a suitable openings on the casing 5 to connect to a source of electrical power and ground.

Figure 8:
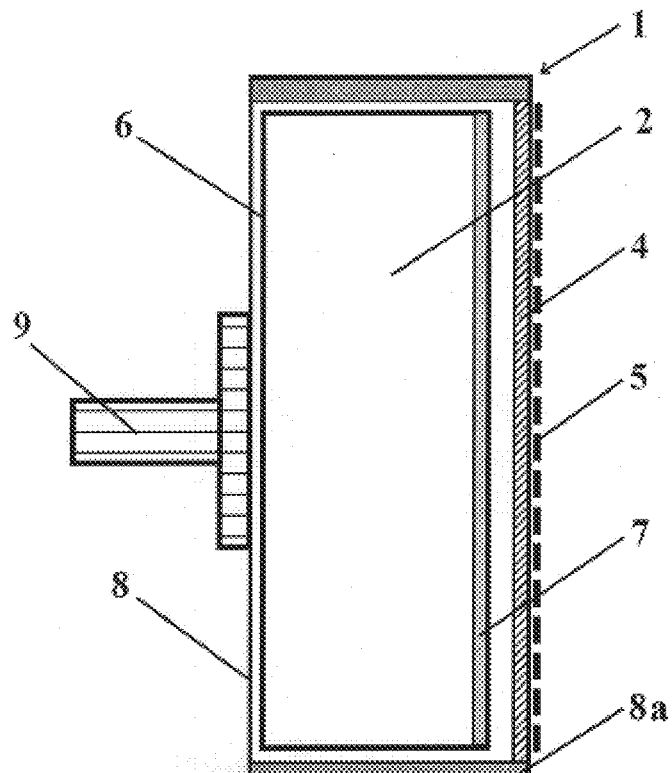
FIG. 8 is a side view of the mirror assembly in which a reflective film is applied directly to the front side of the plastic or glass plate.
Figure 9:
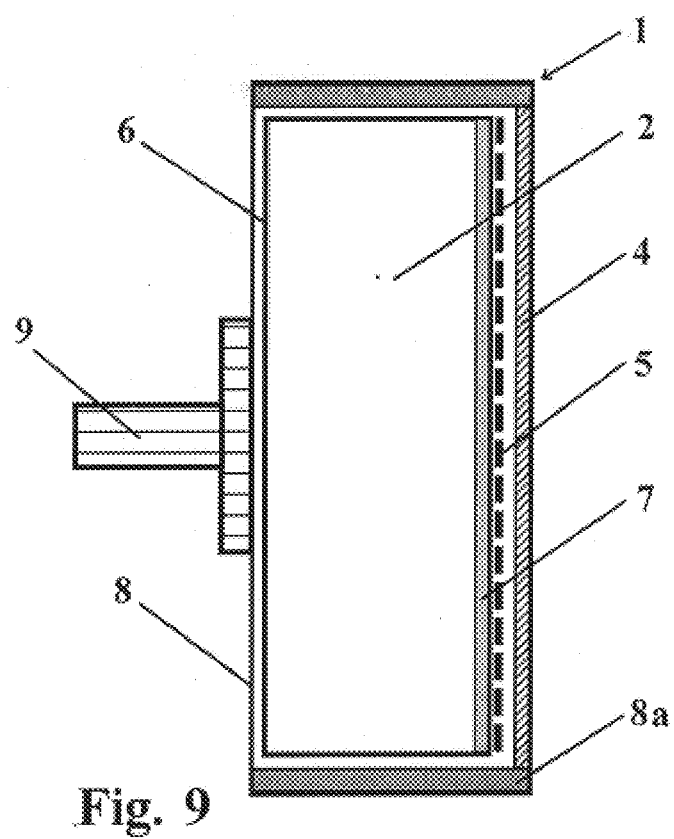
FIG. 9 is a side view of said mirror assembly in which the reflective film is applied directly to the front screen side of a video display monitor.

Although FIGS. 6 and 7 illustrate the preferred embodiments of the invention, FIGS. 8 and 9 illustrate that the reflective film 5 can be placed in a variety of locations, including at a front side of the flat transparent plate 4, which may be either a glass or a plastic plate as shown in FIG. 8. Alteratively, the reflective film 5 can be placed directly on a front side of the video display screen 7 of the video display monitor 2 as shown in FIG. 9.

Figure 10:
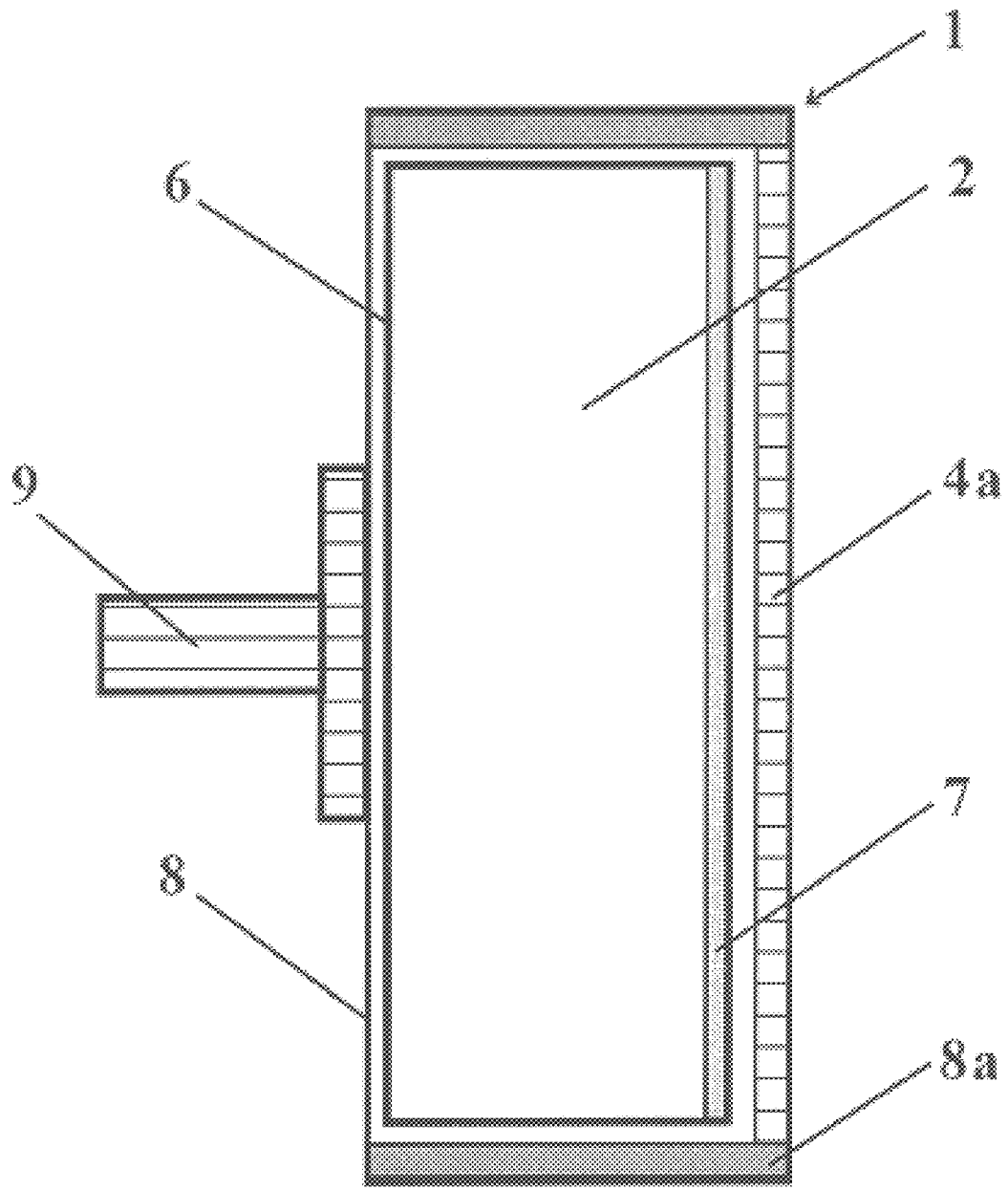
FIG. 10 is another side view of said mirror assembly in which a translucent flat plate is used to replace the reflective film.

It should be noted, however, as illustrated in FIG. 10, that the flat transparent plate 4 described above can be eliminated. Instead, a tinted glass or plastic plate 4a can be used in place of the flat transparent plate without the need for a reflective film.

Figure 11:
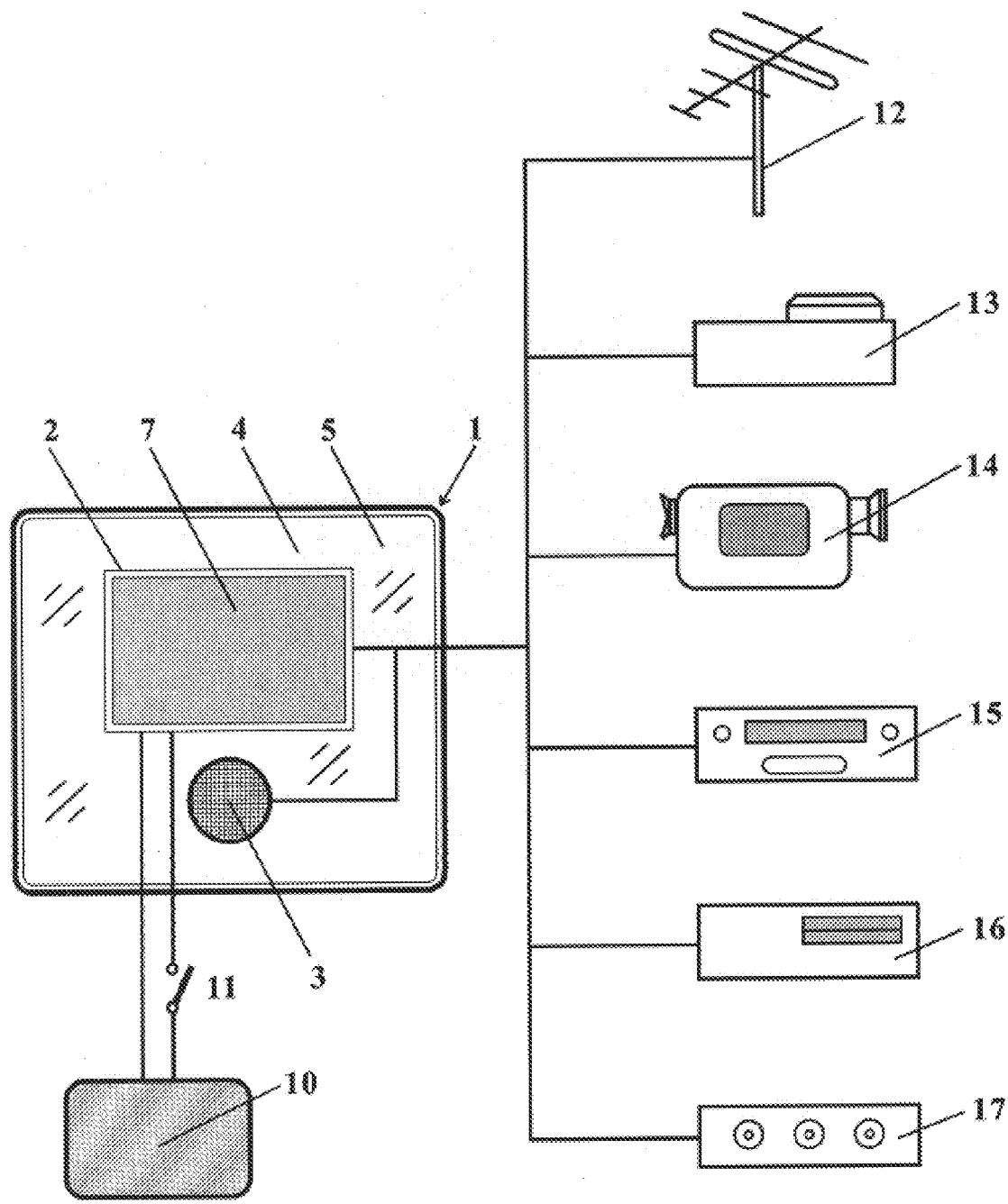
FIG. 11 reveals the multitude of possible applications for the instant invention.

As illustrated in FIG. 11, the video display monitor 2 is provided with a lead wire connecting to a power source 10 through the control of a switch 11 which controls the "on" and "off" status of the video display monitor 2. The video display monitor 2 can be a commercially available monitor equipped with a built-in light source suitably adopted to achieve and to perform the video display function according to the invention. In the alternative, the video display monitor 2 can be made customarily to achieve such video display function. As such, the video display monitor 2 is suitably utilized to display information from a variety of input/output devices or sources, including, but not limited to television broadcast transmitted by a television antenna or a tuner 12, a global positioning system (G.P.S.)or an electronic map device 13, a video camera 14 for recording and transmitting continuous live image and pictures, a video cassette recorder (VCR) or a cable television 15 for viewing video cassette, a computer generated image or information, whether from floppy disk, hard drive, CD ROM, or wireless network 16, and any other type of video and audio device 17 now in existence or hereinafter invented.

It is apparent from the above description, the reflective film 5 in combination with the flat transparent plate 4 as illustrated in FIGS. 6, 7, 8 and 10 or the tinted glass or plastic plate 4a as illustrated in FIG. 10 show translucent characteristic against the incoming light while the video monitor display 2 and the video display screen 7 have solid and non-transparent characteristic. Thus, when the light comes in from the viewing side of the mirror while the video display monitor 2 is not activated, the two-way mirror 1 of the invention functions as an ordinary rear view mirror. On the other hand when the video display monitor 2 is activated, the light emitted from the built-in light source of the video display monitor 2 pass through from the non-viewing side of the mirror 1, thereby allowing a portion of the mirror that corresponds to the area of the video display screen 7 functions as a video displayer.

Figure 12:
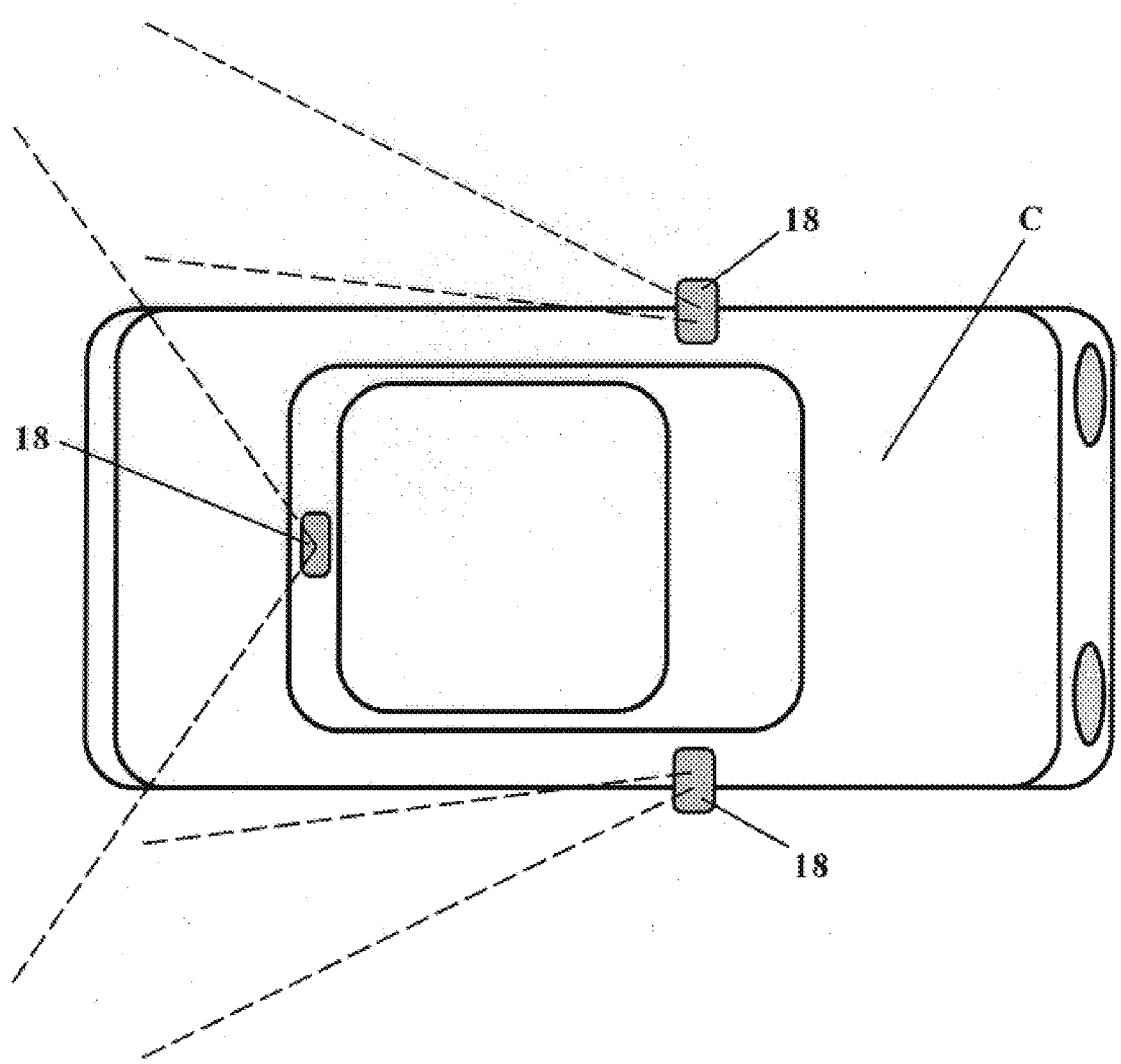
FIG. 12 shows installation of cameras outside a motor vehicle to eliminate "blind spot" in accordance with the invention.

Referring to FIG. 12, there is shown an application of the invention to solve the "inadequate view" or "blind spot" problems associated with the conventional mirrors. One or more cameras 18 are installed either on the left or right side mirrors or on the rear window of the motor vehicle or large truck to provide continuous video input and coverage of the area constituting "blind spot" which can be viewed by the driver inside the vehicle from the two way mirror provided by the invention to eliminate any potential problems resulting from "inadequate view" or "blind spot".

The invention now being fully described, it will be apparent to one of ordinary skill in the art that many changes and modifications can be made thereto without departing from the spirit or scope of the invention as set forth herein.

What is claimed is:

1. A two way mirror suitable for providing alternatively or simultaneously both an ordinary center rear view mirror image and a video image, said two way mirror comprising, in combination (a) a flat transparent plate;
   (b) a reflective film placed upon a backside of said flat transparent plate;
   (c) a casing mounted to a backside of said flat transparent plate to hold said two way mirror; and
   (d) at least one video display monitor with a built-in light source mounted in and enclosed entirely inside said casing and positioned directly behind said reflective film to receive and display image received from a variety of information sources; whereby said two way mirror functions as an ordinary mirror when said video display monitor is inactivated to turn off the built-in light source while the same functions as an image display when said video display monitor is activated to turn on the built-in light source.

2. The two way mirror of claim 1 wherein said flat transparent plate can be either a glass plate or a plastic plate.

3. The two way mirror of claim 1 wherein said information sources consist of a plurality of input/output devices selected from the group of television, satellite transmission including global positioning system, video cassette recorder, video camera, computer, wireless network, and audio devices.

4. A two way mirror suitable for providing alternatively or simultaneously both an ordinary center rear view mirror image and a video image, said two way mirror comprising, in combination (a) a flat transparent plate;

(b) a reflective film placed upon a front side of said flat transparent plate;

(c) a casing mounted to a backside of said flat transparent plate to hold said two way mirror; and (d) at least one video display monitor with a built-in light source mounted in and enclosed entirely inside said casing and positioned directly behind said flat transparent plate to receive and display image received from a variety of information sources; whereby said two way mirror functions as an ordinary mirror when said video display monitor is inactivated to turn off the built-in light source while the same functions as a image display when said video display monitor is activated to turn on the built-in light source.

5. The two way mirror of claim 4 wherein said flat transparent plate can be either a glass plate or a plastic plate.

6. The two way mirror of claim 4 wherein said information sources consist of a plurality of input/output devices selected from the group of television, satellite transmission including global positioning system, video cassette recorder, video camera, computer, wireless network, and audio devices.

7. A two way mirror suitable for providing alternatively or simultaneously both an ordinary center rear view mirror image and a video image, said two way mirror comprising, in combination (a) a flat translucent plate;

(b) a casing mounted to a backside of said flat translucent plate to hold said two way mirror; and (c) at least one video display monitor with a built-in light source mounted in and enclosed entirely inside said casing and positioned directly behind said flat translucent plate to receive and display image received from a variety of information sources; whereby said two way mirror functions as an ordinary mirror when said video display monitor is inactivated to turn off the built-in light source while the same functions as a image display when said video display monitor is activated to turn on the built-in light source.

8. The two way mirror of claim 7 wherein said flat translucent plate can be either a tinted glass plate or a tinted plastic plate.

9. The two way mirror of claim 7 wherein said information sources consist of a plurality of input/output devices selected from the group of television, satellite transmission including global positioning system, video cassette recorder, video camera, computer, wireless network, and audio devices.

10. A two way mirror suitable for providing alternatively or simultaneously both an ordinary center rear view mirror image and a video image, said two way mirror comprising, in combination (a) a flat transparent plate;

(b) a reflective film placed upon a backside of said flat transparent plate;

(c) a casing mounted to a backside of said flat transparent plate to hold said two way mirror; and (d) at least one video display monitor with a built-in light source mounted in said casing and positioned directly behind said reflective film to receive and display image received from a variety of information sources; whereby said two way mirror functions as an ordinary mirror when said video display monitor is inactivated to run off the built-in light source while the same functions as a image display when said video display monitor is activated to turn on the built-in light source.

\* \* \* \* \*

(12) EX PARTE REEXAMINATION CERTIFICATE (5786th)
United States Patent
Lin

(10) Patent Number: US 5,956,181 C1
(45) Certificate Issued: Jun. 19, 2007

(54) TWO WAY MIRROR WITH DUAL FUNCTIONS OF REAR VIEW MIRROR AND VIDEO DISPLAYER

(75) Inventor: William Lin, 38891 Fremont Blvd., Apt#14, Fremont, CA (US) 94536

(73) Assignee: William Lin, Fremont, CA (US)

Reexamination Request:
No. 90/006,778, Sep. 22, 2003

Reexamination Certificate for:
Patent No.: 5,956,181
Issued: Sep. 21, 1999
Appl. No.: 08/896,488
Filed: Jul. 18, 1997

(51) Int. Cl.
*G02B 27/14* (2006.01)

(52) U.S. Cl. ...................................................... 359/630
(58) Field of Classification Search ................ 359/630, 359/631, 632; 348/148, 151
See application file for complete search history.

(56) References Cited

U.S. PATENT DOCUMENTS

| | | | |
|---|---|---|---|
| 4,306,768 A | * 12/1981 | Egging | 359/630 |
| 4,443,819 A | 4/1984 | Funada et al. | 358/236 |
| 4,499,451 A | 2/1985 | Suzuki et al. | 340/98 |
| 4,672,435 A | 6/1987 | Glück | 358/89 |
| 5,207,492 A | 5/1993 | Roberts | 362/30 |
| 5,303,205 A | 4/1994 | Gauthier et al. | 367/108 |
| 5,793,308 A | 8/1998 | Rosinski et al. | 340/903 |
| 5,940,120 A | 8/1999 | Frankhouse et al. | 348/61 |

* cited by examiner

*Primary Examiner*—Timothy Thompson

(57) ABSTRACT

The present invention discloses a two way, rear view mirror suitable for providing alternatively or simultaneously both a conventional reflected image and a video image. A preferred two way mirror of the invention comprises a flat transparent plate coated with or glued with a reflective film mounted within a casing which provides supports for the mirror and a mounting space for at least one video display monitor with a built-in light source mounted in said casing and positioned directly behind said reflective film to receive and display image received from a variety of information sources.

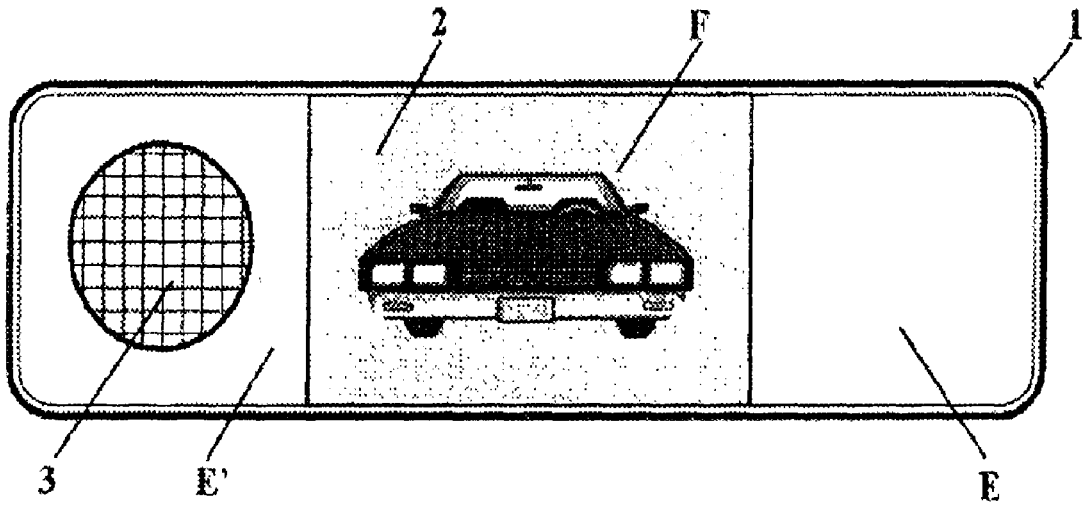

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 5 and 8 are cancelled.

Claims 1, 4, 7 and 10 are determined to be patentable as amended.

Claims 3, 6 and 9, dependent on an amended claim, are determined to be patentable.

1. A two way mirror suitable for providing alternatively or simultaneously both an ordinary center rear view mirror image and a video image, said two way mirror comprising, in combination
   (a) a flat transparent plate;
   (b) a reflective film placed upon a backside of said flat transparent plate;
   (c) a casing mounted to a backside of said flat transparent plate to hold said two way mirror; and
   (d) at least one video display monitor with a built-in light source mounted in and enclosed entirely inside said casing and positioned directly behind said reflective film to receive and display image received from a variety of information sources; whereby said two way mirror functions as an ordinary mirror when said video display monitor is inactivated to turn off the built-in light source while the same functions as an image display when said video display monitor is activated to turn on the built-in light source *wherein said flat translucent plate is either a tinted glass plate or a tinted plastic plate*.

4. A two way mirror suitable for providing alternatively or simultaneously both an ordinary center rear view mirror image and a video image, said two way mirror comprising, in combination
   (a) a flat transparent plate;
   (b) a reflective film placed upon a front side of said flat transparent plate;
   (c) a casing mounted to a backside of said flat transparent plate to hold said two way mirror; and
   (d) at least one video display monitor with a built-in light source mounted in and enclosed entirely inside said casing and positioned directly behind said flat transparent plate to receive and display image received from a variety of information sources; whereby said two way mirror functions as an ordinary mirror when said video display monitor is inactivated to turn off the built-in light source while the same functions as a image display when said video display monitor is activated to turn on the built-in light source *wherein said flat translucent plate is either a tinted glass plate or a tinted plastic plate*.

7. A two way mirror suitable for providing alternatively or simultaneously both an ordinary center rear view mirror image and a video image, said two way mirror comprising, in combination
   (a) a flat translucent plate;
   (b) a casing mounted to a backside of said flat translucent plate to hold said two way mirror; and
   (c) at least one video display monitor with a built-in light source mounted in and enclosed entirely inside said casing and positioned directly behind said flat translucent plate to receive and display image received from a variety of information sources; whereby said two way mirror functions as an ordinary mirror when said video display monitor is inactivated to turn off the built-in light source while the same functions as a image display when said video display monitor is activated to turn on the built-in light source *wherein said flat translucent plate is either a tinted glass plate or a tinted plastic plate*.

10. A two way mirror suitable for providing alternatively or simultaneously both an ordinary center rear view mirror image and a video image, said two way mirror comprising, in combination
    (a) a flat transparent plate;
    (b) a reflective film placed upon a backside of said flat transparent plate;
    (c) a casing mounted to a backside of said flat transparent plate to hold said two way mirror; and
    (d) at least one video display monitor with a built-in light source mounted in said casing and positioned directly behind said reflective film to receive and display image received from a variety of information sources; whereby said two way mirror functions as an ordinary mirror when said video display monitor is inactivated to run off the built-in light source while the same functions as a image display when said video display monitor is activated to turn on the built-in light source *wherein said flat translucent plate is either a tinted glass plate or a tinted plastic plate*.

* * * * *